(12) United States Patent
Agrawal et al.

(10) Patent No.: US 12,204,503 B2
(45) Date of Patent: Jan. 21, 2025

(54) MECHANISM FOR MANAGING A MIGRATION OF DATA WITH MAPPED PAGE AND DIRTY PAGE BITMAP SECTIONS

(71) Applicant: Samsung Electronics Co., Ltd., Suwon-si (KR)

(72) Inventors: Vipin K. Agrawal, San Jose, CA (US); Rajendra Singh, Suwon-si (KR); Chun-Chu Chen-Jhy Archie Wu, San Carlos, CA (US); Vasili Zhdankin, Prior Lake, MN (US); Syed Kaiser, San Ramon, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/412,068

(22) Filed: Aug. 25, 2021

(65) Prior Publication Data

US 2022/0405253 A1 Dec. 22, 2022

Related U.S. Application Data

(60) Provisional application No. 63/213,524, filed on Jun. 22, 2021.

(51) Int. Cl.
*G06F 16/21* (2019.01)
*G06F 16/22* (2019.01)

(52) U.S. Cl.
CPC ........ *G06F 16/214* (2019.01); *G06F 16/2237* (2019.01)

(58) Field of Classification Search
CPC .......................... G06F 16/214; G06F 16/2237
See application file for complete search history.

(56) References Cited

U.S. PATENT DOCUMENTS

| | | |
|---|---|---|
| 7,836,226 B2 | 11/2010 | Flynn et al. |
| 9,047,178 B2 | 6/2015 | Talagala et al. |
| 9,369,687 B2 | 6/2016 | Braness et al. |
| 9,430,412 B2 | 8/2016 | Huang |
| 9,542,118 B1 | 1/2017 | Lercari et al. |
| 10,275,361 B2 | 4/2019 | Ish et al. |
| 10,282,094 B2 | 5/2019 | Kachare et al. |
| 10,409,716 B2 | 9/2019 | Gholamipour et al. |
| 10,503,404 B2 | 12/2019 | Frolikov |

(Continued)

FOREIGN PATENT DOCUMENTS

| | | |
|---|---|---|
| EP | 1826662 A3 | 1/2010 |
| JP | 2007-226596 A | 9/2007 |

(Continued)

OTHER PUBLICATIONS

EPO Extended European Search Report dated Nov. 25, 2022, issued in corresponding European Patent Application No. 22179937.2 (8 pages).

*Primary Examiner* — Hares Jami
(74) *Attorney, Agent, or Firm* — Lewis Roca Rothgerber Christie LLP

(57) ABSTRACT

A method for managing a live migration operation includes partitioning a first data structure into N sections of the first data structure, the first data structure indicating a location, associated with a source storage, having data to be copied to a target storage, and transferring less than all of the N sections of the first data structure to a migration server.

20 Claims, 8 Drawing Sheets

(56) References Cited

U.S. PATENT DOCUMENTS

| | | | |
|---|---|---|---|
| 10,545,863 B2 | 1/2020 | Kanno et al. | |
| 10,635,529 B2 | 4/2020 | Bolkhovitin | |
| 10,866,733 B2 | 12/2020 | Kanno et al. | |
| 10,872,015 B2 | 12/2020 | Secatch et al. | |
| 10,909,030 B2 | 2/2021 | Desai et al. | |
| 11,249,655 B1* | 2/2022 | Chen | G06F 3/0683 |
| 11,681,633 B2 | 6/2023 | Byun | |
| 2007/0204119 A1* | 8/2007 | Murotani | G06F 3/0664 |
| | | | 711/112 |
| 2014/0281306 A1* | 9/2014 | Nakajima | G06F 3/0685 |
| | | | 711/162 |
| 2015/0370501 A1 | 12/2015 | Aikoh et al. | |
| 2018/0052620 A1* | 2/2018 | Driesen | G06F 3/0617 |
| 2018/0275898 A1* | 9/2018 | Bhansali | G06F 11/14 |
| 2020/0356493 A1* | 11/2020 | Mukherjee | G06F 12/1009 |
| 2022/0091770 A1* | 3/2022 | Abouelwafa | G06F 3/065 |

FOREIGN PATENT DOCUMENTS

| | | |
|---|---|---|
| JP | 2012-019548 A | 1/2012 |
| KR | 10-2021-0011216 A | 2/2021 |
| WO | 2015/074033 A1 | 5/2015 |

* cited by examiner

MECHANISM FOR MANAGING A MIGRATION OF DATA WITH MAPPED PAGE AND DIRTY PAGE BITMAP SECTIONS

CROSS-REFERENCE TO RELATED APPLICATION(S)

The present application claims priority to, and the benefit of, U.S. Provisional Application Ser. No. 63/213,524, filed Jun. 22, 2021, entitled "LIVE MIGRATION MAPPED PAGE AND DIRTY PAGE BITMAP MANAGEMENT ALGORITHM," the entire content of which is incorporated herein by reference.

FIELD

One or more aspects of embodiments according to the present disclosure relate to computer storage, and more particularly to methods, devices, and systems for managing migration operations (e.g., live migration operations).

BACKGROUND

The present background section is intended to provide context only, and the disclosure of any embodiment or concept in this section does not constitute an admission that said embodiment or concept is prior art.

In the field of computer storage, a live migration operation (or live migration process) may refer to a copying of data from a source storage to a target storage at a time when the source storage may potentially receive a user data write from a source server (e.g., a normal source server or host). Data structures (e.g., bitmaps) may be used to track locations of data within the source storage to be copied to the target storage. For example, an entire source storage drive, having a large storage capacity (e.g., 8 terabytes (TB)), may have each logical block address (LBA) (e.g., 4 kilobytes (KB)) represented by a single bit of metadata to indicate whether a particular LBA includes data that should be copied from the source storage to the target storage. Although the metadata associated with a bitmap is small compared to the storage capacity of a storage device, the bitmap metadata uses memory space and bandwidth that may become increasingly burdensome on a storage system as the storage capacity is increased.

Accordingly, there is a need for methods, devices, and systems for efficiently managing the use of bitmaps for mapping and updating data associated with a live migration process.

SUMMARY

Aspects of embodiments of the present disclosure relate to computer storage systems, and provide improvements to the management of metadata (e.g., bitmaps) for identifying locations in a source storage having data to be copied to a target storage.

According to some embodiments of the present disclosure, there is provided a method for managing a migration of data, the method including partitioning a first data structure into N sections of the first data structure, the first data structure indicating a location, associated with a source storage, having data to be copied to a target storage, and transferring less than all of the N sections of the first data structure to a migration server.

The method may further include partitioning a second data structure into N sections of the second data structure, tracking, by using the second data structure, a location of a data write to the source storage that occurred during or after the transferring of the less than all of the N sections of the first data structure, and transferring less than all of the N sections of the second data structure to the migration server, one or more sections of the less than all of the N sections of the second data structure indicating the location of the data write to the source storage that occurred during or after the transferring of the less than all of the N sections of the first data structure.

The method may further include storing a passive copy of one active section of the N sections of the second data structure in an N+1th section of a memory of a storage controller, transferring the passive copy to the migration server, and tracking a data write to the source storage associated with the one active section of the N sections during or after the transferring of the passive copy to the migration server.

The method may further include run length encoding a metadata associated with the second data structure.

A first section of the less than all of the N sections of the second data structure may be selected for the transferring based on a section status indicator corresponding to the first section, the section status indicator indicating that a source data corresponding to the first section is to be copied to the target storage, and the method may further include transferring the section status indicator to the migration server, and selecting, by the migration server, the first section for a source data copying operation based on the section status indicator.

The section status indicator may include a first state indicating that a section of the N sections of the second data structure corresponds to a source data to be copied to the target storage, and a second state indicating that a section of the N sections of the second data structure is to be omitted from selection for the transferring.

A first section of the less than all of the N sections of the first data structure may be selected for the transferring based on a section status indicator corresponding to the first section, the section status indicator indicating that a source data corresponding to the first section is to be copied to the target storage, and the method may further include transferring the section status indicator to the migration server.

The section status indicator may include a first state indicating that a section of the N sections of the first data structure corresponds to a source data to be copied to the target storage, and a second state indicating that a section of the N sections of the first data structure is to be omitted from selection for the transferring.

The method may further include run length encoding a metadata associated with the first data structure.

According to other embodiments of the present disclosure, there is provided a storage device for managing a migration of data, the storage device being configured to partition a first data structure into N sections of the first data structure, the first data structure indicating a location, associated with a source storage, having data to be copied to a target storage, and transfer less than all of the N sections of the first data structure to a migration server.

The storage device may be configured to partition a second data structure into N sections of the second data structure, track, by using the second data structure, a location of a data write to the source storage that occurred during or after a transfer of the less than all of the N sections of the first data structure, and transfer less than all of the N sections of the second data structure to the migration server, one or more sections of the less than all of the N sections of the second data structure indicating the location of the data write to the source storage that occurred during or after the transfer of the less than all of the N sections of the first data structure.

The storage device may be configured to store a passive copy of one active section of the N sections of the second data structure in an N+1th section of a storage controller memory, transfer the passive copy to the migration server, and track a data write to the source storage associated with the one active section of the N sections during or after the transfer of the passive copy to the migration server.

The storage device may be configured to run length encode a metadata associated with the second data structure.

The storage device may be configured to select a first section of the less than all of the N sections of the second data structure for the transfer based on a section status indicator corresponding to the first section, the section status indicator indicating that a source data corresponding to the first section is to be copied to the target storage, and transfer the section status indicator to the migration server.

The section status indicator may include a first state indicating that a section of the N sections of the second data structure corresponds to a source data to be copied to the target storage, and a second state indicating that a section of the N sections of the second data structure is to be omitted from selection for the transfer.

The storage device may be configured to select a first section of the less than all of the N sections of the first data structure for the transfer based on a section status indicator corresponding to the first section, the section status indicator indicating that a source data corresponding to the first section is to be copied to the target storage, and transfer the section status indicator to the migration server.

The section status indicator may include a first state indicating that a section of the N sections of the first data structure corresponds to a source data to be copied to the target storage, and a second state indicating that a section of the N sections of the first data structure is to be omitted from selection for the transfer.

The storage device may be configured to run length encode a metadata associated with the first data structure.

According to other embodiments of the present disclosure, there is provided a system for managing a migration of data, the system including a migration server, and a storage device, wherein the storage device is configured to partition a first data structure into N sections of the first data structure, the first data structure indicating a location, associated with a source storage, having data to be copied to a target storage, and transfer less than all of the N sections of the first data structure to the migration server.

The storage device may be configured to partition a second data structure into N sections of the second data structure, track, by using the second data structure, a location of a data write to the source storage that occurred during or after a transfer of the less than all of the N sections of the first data structure, and transfer less than all of the N sections of the second data structure to the migration server, one or more sections of the less than all of the N sections of the second data structure indicating the location of the data write to the source storage that occurred during or after the transfer of the less than all of the N sections of the first data structure.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
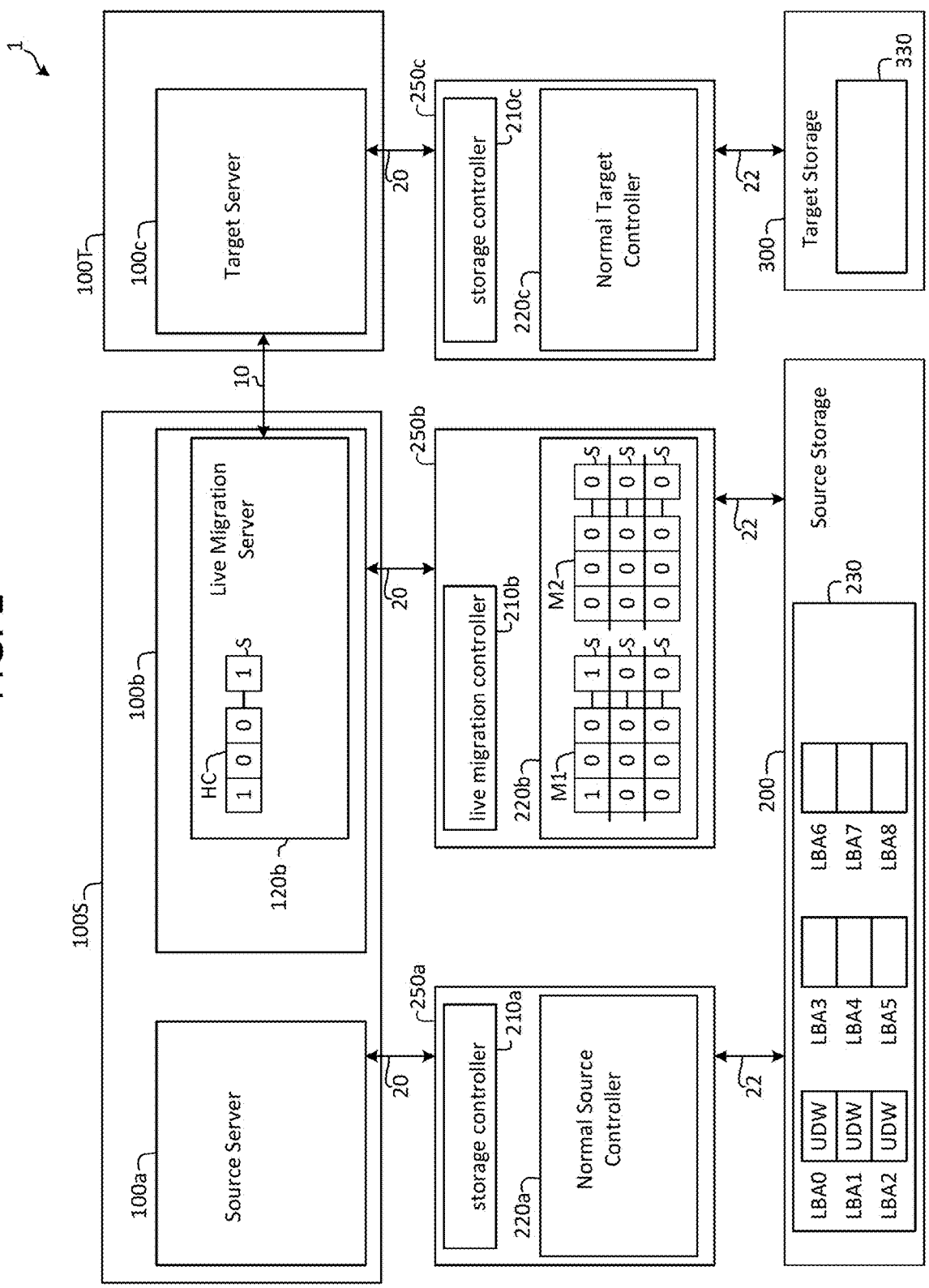
FIG. 1 is a system diagram depicting a system for managing a migration of data, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are example operations, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In the field of computer storage, a live migration operation (or live migration process) may refer to a copying of data from a source storage to a target storage at a time when the source storage may potentially receive a user data write from a normal source host. For example, a hyperscaler or a cloud customer may implement a live migration strategy, where data corresponding to a source storage may be moved from the source storage to a new (or target) storage while the data at the source storage may be changing (e.g., receiving user data writes). A live migration strategy may involve moving a namespace (e.g., a grouping of objects in a storage) from a source controller (or source storage) to a target controller (or target storage).

As will be discussed in further detail below (in reference to the figures), a source controller may assist a migration server in managing a live migration by creating a bitmap of "mapped" pages (a "BMP") at the beginning of the live migration process, and one or more subsequent bitmaps of "dirty" pages (a "BDP") during the live migration process to show the migration server where data has changed, at the source storage, following the migration server's copying of the data from the source storage to the target storage.

A migration system's performance may be burdened during a live migration due to a heavy drain on computing resources (e.g., memory and bandwidth). For example, in the case of tracking changes to data in the source storage, a current copy of the BDP may be "frozen" (e.g., may be a BDP snapshot), while transferred to a migration server, and another copy of the BDP may be used to allow tracking of dirty pages. Thus, a storage controller memory may be occupied by two copies of the entire BDP (one entire BDP for transferring to the migration server and one for tracking data updates corresponding to the BDP in the source storage). When a BDP snapshot is in the migration server's memory, the server's processor may walk through (e.g., parse) each and every bit of the BDP to identify a location of a "dirty" page (for copying to the target storage).

In the case of creating an initial BMP, the storage controller may maintain a BMP having a size corresponding to the whole (e.g., entire) namespace. When a BMP snapshot is in the host memory, the host processor may walk through each and every bit of the BMP to identify a location of a "valid" page (for copying to the target storage). A valid page may be a page (or LBA) corresponding the namespace that has data present, as opposed to having no data present.

A storage device having a larger storage capacity may be desirable for storing more data. However, live migration of data may become increasingly slow and inefficient as storage device capacity increases because more memory (e.g., RAM space) on the storage device may be required to perform live migration, which may then be unavailable for prime usage by processes running on the storage system.

That is, the size of the bitmaps used to manage a live migration may be a function of a device capacity (e.g., the size of the bitmap for performing a live migration may increase linearly with the size of the device). For example, a storage device supporting 4 KB granularity and having a device capacity of 2 TB may use a bitmap of 64 megabytes (MB); a device capacity of 4 TB may use a bitmap of 128 MB; and a device capacity of 8 TB may use a bitmap of 256 MB.

A storage device (e.g., a solid state drive (SSD)) may have a DRAM size of 4 GB or 8 GB. Accordingly, an 8 TB device using a bitmap of 256 MB may occupy about 1/16 of the space of a 4 GB DRAM (or about 1/32 of the space of an 8 GB DRAM).

According to some embodiments of the present disclosure, and as discussed in further detail below, instead of working on a whole BDP snapshot, the BDP may be divided into N sections, and a single spare section may suffice for allowing a snapshot and tracking to take place simultaneously. Accordingly, memory usage may be reduced from two times the BDP size to (N+1)/N times the BDP size.

In some embodiments, the number of sections N may be determined based on a probability of set bits (e.g., dirty bits) in a section of the dirty bitmap (BDP), which may be determined by (e.g., may depend on) a user (e.g., an end user) of the system. For example, if user data writes are more likely to be relatively condensed, N may be a relatively lower number. If user data writes are more likely to be relatively scattered, N may be a relatively higher number.

In some embodiments, a BDP (or BMP) may be divided into about 32 sections. For example, 32 sections may be a generally useful (e.g., workable) number of sections for many current systems, considering current device storage capacities and common user data write patterns. However, the present disclosure is not limited thereto.

Furthermore, a per BDP section "dirty section" bitmap may be provided, which includes only N bits. A migration server may process the dirty BDP section only if an associated BDP section dirty bit is set. Typically, less than one page will be dirty per 10,000 pages. Accordingly, a host BDP parsing workload may be reduced. Additionally, a storage controller may avoid sending clean BDP sections to the migration server, thereby reducing bandwidth usage and transfer time.

According to some embodiments of the present disclosure, and as discussed in further detail below, a BMP may be divided into N sections, and a storage controller may work on one section at a time. Thus, memory usage may be reduced to two sections at a time. For example, the storage controller may work on one section (e.g., Section K), transfer it to a migration server (e.g., to a reserved section of the migration server), and continue working on the next section (e.g., Section K+1) while a current section (e.g., Section K) is being transmitted to the migration server.

In some embodiments, the migration server may be provided with intermediate updates so that the migration server may start working on a BMP section without waiting for the whole BMP to be copied into the host memory, thus, reducing a processing time.

Furthermore, a per BMP section bitmap may be provided, which may include only N bits. A migration server may process the mapped BMP sections only if an associated BMP section "mapped" bit is set. Accordingly, a host parsing workload may be reduced.

In some embodiments, a storage controller may refrain from sending a clean BMP section to the migration server (e.g., because there is no data corresponding to a clean section of the BMP for copying to a target), thereby reducing bandwidth usage and transfer time.

Thus, aspects of embodiments of the present disclosure may provide several improvements and advantages for live migration in the field of computer storage. For example, an amount of memory used for processing a live migration may be reduced by avoiding redundant copying of an entire BDP and an entire BMP; bandwidth consumption may be reduced because the entire BDP and the entire BMP need not be transferred; processing times for the live migration may be reduced because the entire BDP and the entire BMP need not be parsed. In sum, a live migration may be performed more quickly and with less memory according to aspects of embodiments of the present disclosure.

A mechanism for managing a migration of data from a source storage (including one or more storage devices) to a target storage may allow for the use of fewer computing resources (e.g., memory space, data-bus bandwidth, and processing time) for tracking and transferring data associated with bitmaps (or other data structures) during a live (or static) migration process. The mechanism may include partitioning the bitmaps, which indicate locations of data within the source storage that are associated with a namespace for migration, into N sections for mapping, tracking, and transferring purposes.

Furthermore, each section of the N sections of the bitmaps may be associated with a section status indicator bit, which may be transferred from a storage controller of a storage device to a migration server (e.g., a host associated with managing the live migration process) along with the associated section of the N sections.

In the storage device's memory (e.g., RAM), the section status indicator bits may collectively form a per section status indicator bitmap of only N bits, allowing for a quick selective transfer of bitmap sections. In the migration server's memory, the section status indicator bits may collectively form a per section status indicator bitmap of only N bits, allowing the migration server to quickly identify and work on migrating data within the source storage corresponding to the relevant sections of the N sections.

Furthermore, metadata associated with the bitmaps (e.g., metadata associated with the N sections of the bitmaps) and the section status indicator bits may be run length encoded before transferring the metadata from the storage controller to the migration server (to further save memory space, data bus bandwidth, and host processing overhead).

FIG. 1 is a system diagram depicting a system for managing a migration of data, according to some embodiments of the present disclosure.

Referring to FIG. 1, the system 1 may include a source host system 100S and a target host system 100T. The source host system 100S may be connected to a source storage 200, and the target host system 100T may be connected to a target storage 300.

The source storage 200 and the target storage 300 may include logical block addresses (LBAs) (e.g., LBA0 to LBA8 depicted within the source storage 200 for a simplified example), which may be associated with physical locations in the source storage 200 and the target storage 300 for storing data (e.g., a user's data).

The target host system 100T may include a target server 100c (e.g., a normal target server). The target server 100c may be connected to a target storage device 250c (e.g., a normal target storage device) via a communications link 20. The communications link 20 may include (e.g., may be implemented by way of) a variety of technologies (e.g., peripheral component interconnect express (PCIe), non-volatile memory express (NVMe) over PCIe, NVMe over Fabrics (NVMe-oF), etc.).

The target storage device 250c may include a target storage controller 210c and a target controller memory 220c. The target controller memory 220c may include (e.g., may be) random access memory (RAM) (e.g., static random access memory (SRAM) or dynamic random access memory (DRAM)). The target storage controller 210c may include (e.g., may be implemented by way of) embedded logic (e.g., embedded within the target storage device 250c) for handling requests from a server (e.g., the target server 100c) to copy data to (e.g., to write to) the target storage 300. The target storage device 250c may include the target storage 300 (or a portion of the target storage 300). For example, the target storage 300 may include a target memory 330. The target memory 330 may include (e.g., may be) a long term memory. For example, the target memory 330 may include a non-volatile memory and/or a memory tier (including volatile and non-volatile memory) and may correspond to long term memories of one or more target storage devices 250c. For example, the target storage 300 may refer to a long term memory made up of one or more target storage devices 250c of a distributed storage system (e.g., a virtualized distributed storage system). The target storage device 250c may be a solid state drive (SSD) including one or more underlying target storage devices 250c, which may be virtual or physical. The target storage device 250c may be connected to the target storage 300 via a storage interface 22. The storage interface 22 may include (e.g., may be) a flash interface (e.g., a NAND flash interface) or a remote interface (e.g., implemented by way of ethernet).

The source host system 100S may include a source server 100a (e.g., a normal source server or host). The source server 100a may serve read and write requests from a user application. For example, a user may use an application (e.g., a word processing application) and send a user data write UDW (e.g., a user application data write) or a user data read UDR (e.g., a user application data read) to the source storage 200 (e.g., via the source storage device 250a).

The source server 100a may be connected to a source storage device 250a (e.g., a normal source storage device) via a communications link 20. The communications link 20 may include (e.g., may be implemented by way of) a variety of technologies (e.g., peripheral component interconnect express (PCIe), non-volatile memory express (NVMe) over PCIe, NVMe over Fabrics (NVMe-oF), etc.).

The source storage device 250a may include a source storage controller 210a and a source controller memory 220a. The source controller memory 220a may include (e.g., may be) random access memory (RAM) (e.g., static random access memory (SRAM) or dynamic random access memory (DRAM)). The source storage controller 210a may include (e.g., may be implemented by way of) embedded logic (e.g., embedded within the source storage device 250a) for handling requests from a server (e.g., the source server 100a) to copy data to (e.g., to write to) the source storage 200. The source storage device 250a may include the source storage 200 (or a portion of the source storage 200). For example, the source storage 200 may include a source memory 230. The source memory 230 may include (e.g., may be) a long term memory. For example, the source memory 230 may include a non-volatile memory and/or a memory tier (including volatile and non-volatile memory) and may correspond to long term memories of one or more source storage devices 250a. For example, the source storage 200 may refer to a long term memory made up of one or more source storage devices 250a of a distributed storage system (e.g., a virtualized distributed storage system). The source storage device 250a may be a solid state drive (SSD) including one or more underlying source storage devices 250a, which may be virtual or physical. The source storage device 250a may be connected to the source storage 200 via a storage interface 22. The storage interface 22 may include (e.g., may be) a flash interface (e.g., a NAND flash interface) or a remote interface (e.g., implemented by way of ethernet).

The source host system 100S may include a live migration server 100b. The live migration server 100b may be a server that is assigned higher privileges to access data within the system 1 than the source server 100a or the target server 100c. The live migration server 100b may be assigned to manage a live migration operation (e.g., a live migration process) for copying data from the source storage 200 to the target storage 300. The live migration server 100b may include a live migration server memory 120b. The live migration server memory 120b may include (e.g., may be) random access memory (RAM) (e.g., static random access memory (SRAM) or dynamic random access memory (DRAM)). The live migration server memory 120b may be used to store metadata for managing (e.g., monitoring and/or directing) the live migration operation. The live migration server 100b may be connected to a live migration storage device 250b via a communications link 20. The communications link 20 may include (e.g., may be implemented by way of) a variety of technologies (e.g., peripheral component interconnect express (PCIe), non-volatile memory express (NVMe) over PCIe, NVMe over Fabrics (NVMe-oF), etc.).

The live migration storage device 250b may be a storage device that is assigned higher privileges to access data within the system 1 than the source storage device 250a or the target storage device 250c. The live migration storage device may be assigned to assist in the live migration operation for copying data from the source storage 200 to the target storage 300.

The live migration storage device 250b may include a live migration controller 210b and a live migration controller memory 220b. The live migration controller memory 220b may include (e.g., may be) random access memory (RAM) (e.g., static random access memory (SRAM) or dynamic random access memory (DRAM)). The live migration controller memory 220b may be used to store metadata for managing (e.g., monitoring and/or directing) the live migration operation. The live migration controller 210b may include (e.g., may be implemented by way of) embedded logic (e.g., embedded within the live migration storage device 250b) for assisting the live migration server 100b in copying data from the source storage 200 to the target storage 300. The live migration storage device 250b may be connected to the source storage 200 via a storage interface 22. The storage interface 22 may include (e.g., may be) a flash interface (e.g., a NAND flash interface) or a remote interface (e.g., implemented by way of ethernet).

The live migration server 100b may be connected (e.g., linked) to the target server 100c via a live migration server to target link 10. The live migration server to target link 10 may be implemented by a variety of technologies depending on whether the system 1 is implemented via hardware (HW), software (SW), or a combination of HW and SW. For example, it should be understood that the servers and storage devices of the system 1 may be implemented via HW, SW, or a combination of HW and SW. For example, in some embodiments, the live migration server to target link 10 may be a physical network connection (e.g., ethernet). In some embodiments, one or more of the servers (e.g., the source server 100a, the live migration server 100b, or the target server 100c) may be software entities. For example, one or more of the servers may be virtual machines (VMs) managed by a hypervisor associated with one or more central processing units (CPUs). Likewise, one or more of the storage devices 250a, 250b, 250c and/or the source storage 200 and/or the target storage 300 may be virtualized and implemented by way of HW and/or SW techniques. For example, one or more of the storage devices 250a, 250b, 250c and/or the source storage 200 and/or the target storage 300 may be provided by any combination of physical storage devices. For example, a migration may be from a first virtual machine to a second virtual machine but both virtual machines may be supported by one physical storage device. It should be understood that a variety of other combinations between, for example, physical and virtual devices may be implemented and do not depart from the spirit and scope of the present disclosure.

In some embodiments, the live migration server 100b may be linked (e.g., connected) to the target storage device 250c via a communications link 20. In some embodiments, the source server 100a may be linked to the live migration server via a live migration server to source link 10. For example, the live migration server to source link 10 may be implemented by a variety of technologies depending on whether the system 1 is implemented via hardware (HW), software (SW), or a combination of HW and SW).

The live migration server 100b and the live migration controller 210b may coordinate a management of a live migration process by communicating metadata that is indicative of a status of data corresponding to the LBAs in the source storage 200. For example, the live migration server 100b may send metadata associated with a namespace to the live migration controller 210b. The live migration controller 210b may work on mapping the namespace to the relevant data (e.g., "valid" data), within the source storage 200, to be copied to the target storage 300. The live migration controller 210b may create a first data structure M1 (e.g., a first bitmap) of metadata as it maps the namespace to the source storage. For example, at a mapping stage of the live migration process, the first data structure M1 may be referred to as a bitmap of mapped pages (a "BMP"), each LBA being referred to as a "page" or "NAND page." The first data structure M1 may be stored (e.g., temporarily stored) in the live migration controller memory 220b.

The BMP may include bits representing whether a given LBA includes valid data to be copied to the target storage 300. Each LBA, which may include 4 kilobytes (KB) of data, may be represented by one bit in the bitmap. For example, a "0" bit may indicate that a given LBA has no valid data to be copied to the target storage 300, and a "1" bit may indicate that a given LBA does have valid data to be copied to the target storage 300. Thus, an entire drive having a large storage capacity, e.g., 8 terabytes (TB) of data in the source storage 200, may be represented by way of a bitmap having, e.g., 256 megabytes (MB) of metadata.

The live migration controller 210b may transfer (e.g., send a copy of) the first data structure M1 to the live migration server 100b. The live migration server 100b may use the first data structure M1 to work on copying the relevant data from the source storage 200 to the target storage 300 (e.g., via a live migration copy read operation LM-CP-Read, or LMCPR, and a live migration copy write operation LM-CP-Write, or LMCPW). The first data structure M1 may be stored in the live migration server memory 120b as a host copy HC (e.g., a host "snapshot").

Because the process of copying and writing the data from the source storage 200 to the target storage 300 may take a significant amount of time, the live migration controller 210b may create a second data structure M2 (e.g., a second bitmap) of metadata (which may be referred to as a bitmap of "dirty" pages ("BDP")) for tracking locations of user data writes UDW to the source storage 200 and indicating the locations of LBAs corresponding to the user data writes as data to be copied from the source storage 200 to the target storage 300 at a later iteration of copying by the live migration server 100b. For example, the BDP may be used by the live migration server to update the relevant data at the target storage 300, based on a change to the relevant data at the source storage 200.

In some embodiments, and as discussed further below in reference to FIGS. 4-6, the live migration controller 210b may partition the first data structure M1 (during or after the mapping stage of the live migration process) and/or the second data structure M2 (during or after an active tracking stage of the live migration process) into N sections. The live migration controller 210b may transfer less than all of the N sections of the first data structure to the migration server 100b. For example, the live migration controller 210b may transfer one or more sections of the N sections at a time to the live migration server 100b.

Accordingly, the live migration controller 210b may provide the first data structure M1 and the second data structure M2, for managing the live migration process, in a manner that improves the live migration process by consuming less memory (e.g., at the live migration controller memory 220b and at the live migration server memory 120b) and less bandwidth during the transferring of the metadata associated with the first data structure M1 and the second data structure M2. For example, rather than transferring an entire first data structure M1 and tracking user data writes UDW with a second data structure M2 that is equal in size to the entire first data structure M1, and consuming an amount of memory corresponding to two times the size of the N sections, less than all of (e.g., only one of) the N sections may be transferred at a time while tracking occurs with respect to all of the N sections. Thus, memory usage may be reduced from two times the entire data structure size to (N+1)/N times the entire data structure size. Furthermore, bandwidth usage may be reduced because less bandwidth may be used in transferring less than all of (e.g., only one of) the N sections versus transferring an entire data structure including all of the N sections. Moreover, the live migration server 100b may process (e.g., parse) less than all of (e.g., only one of) the N sections quicker than processing all of the N sections to identify LBAs having data to be copied over from the source storage 200 to the target storage 300.

In some embodiments, the live migration controller 210b may provide (e.g., associate) each section of the N sections with a section status indicator bit S. For example, the section status indicator bit S associated with a given section of the N sections may indicate whether the given section has valid data or not (e.g., when the section corresponds to a BMP) or whether the given section has dirty data or not (e.g., when the section corresponds to a BDP).

For example, in a BMP, the live migration controller 210b may set a section status indicator bit S to a "1" for a given section to indicate that the given section corresponds to a location where valid data exists in the source storage 200 to be copied to the target storage 300, and a "0" bit may be set to indicate that the given section does not correspond to a location where valid data exists in the source storage 200 to be copied to the target storage 300.

In a BDP, the live migration controller 210b may set a section status indicator S to a "1" bit for a given section to indicate that the given section corresponds to a location where dirty data (e.g., a changed data) exists in the source storage 200 to be copied to the target storage 300, and a "0" bit may be set to indicate that the given section does not correspond to a location where dirty data exists in the source storage 200 to be copied to the target storage 300.

In some embodiments, the live migration controller 210b may select and/or transfer a given section of the N sections to the live migration controller 100b based on whether the given section has a section status indicator S (e.g., a section status indicator bit) set to a "1" or a "0."

In some embodiments, the section status indicator S may be transferred to the live migration server 100b along with its associated section. For example, in the live migration server memory 120b, the section status indicator bits may collectively form a per section status indicator bitmap 121S of only N bits (see, e.g., FIG. 2, FIG. 3, FIG. 4, and FIG. 6). Accordingly, a processing time of the live migration server 100b may be improved (e.g., reduced) by being enabled to identify and work on a live migration operation based on referring to the per section status indicator bitmap 121S (instead of having to parse through each bit of an entire bitmap, or even having to parse through each bit of a given section of a bitmap).

Figure 2:
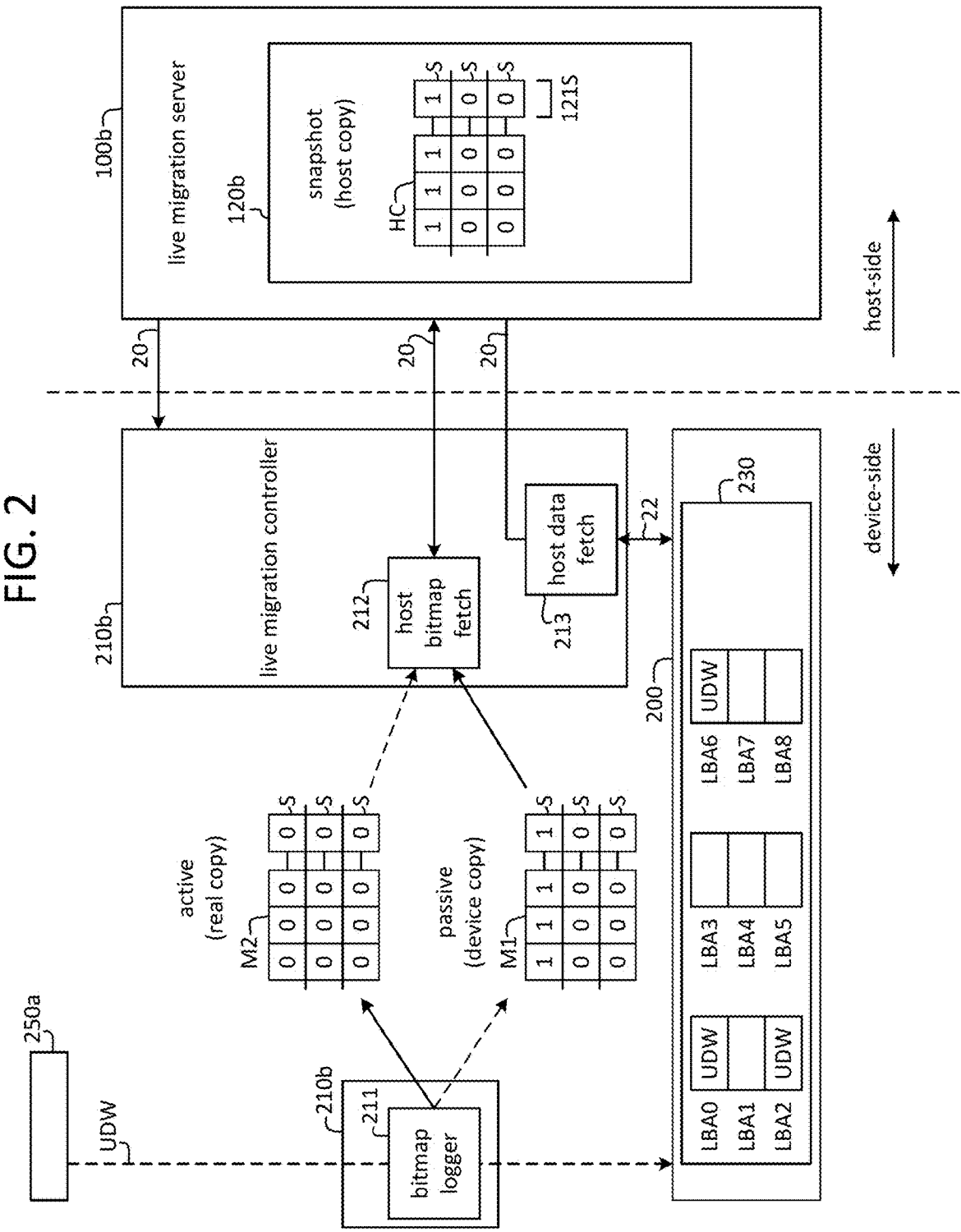
FIG. 2 is a simplified conceptual diagram depicting a transferring of a passive first bitmap and a tracking of user data writes with an active second bitmap, according to some embodiments of the present disclosure.

FIG. 2 is a simplified conceptual diagram depicting a transferring of a passive first bitmap and a tracking of user data writes with an active second bitmap, according to some embodiments of the present disclosure.

Figure 3:
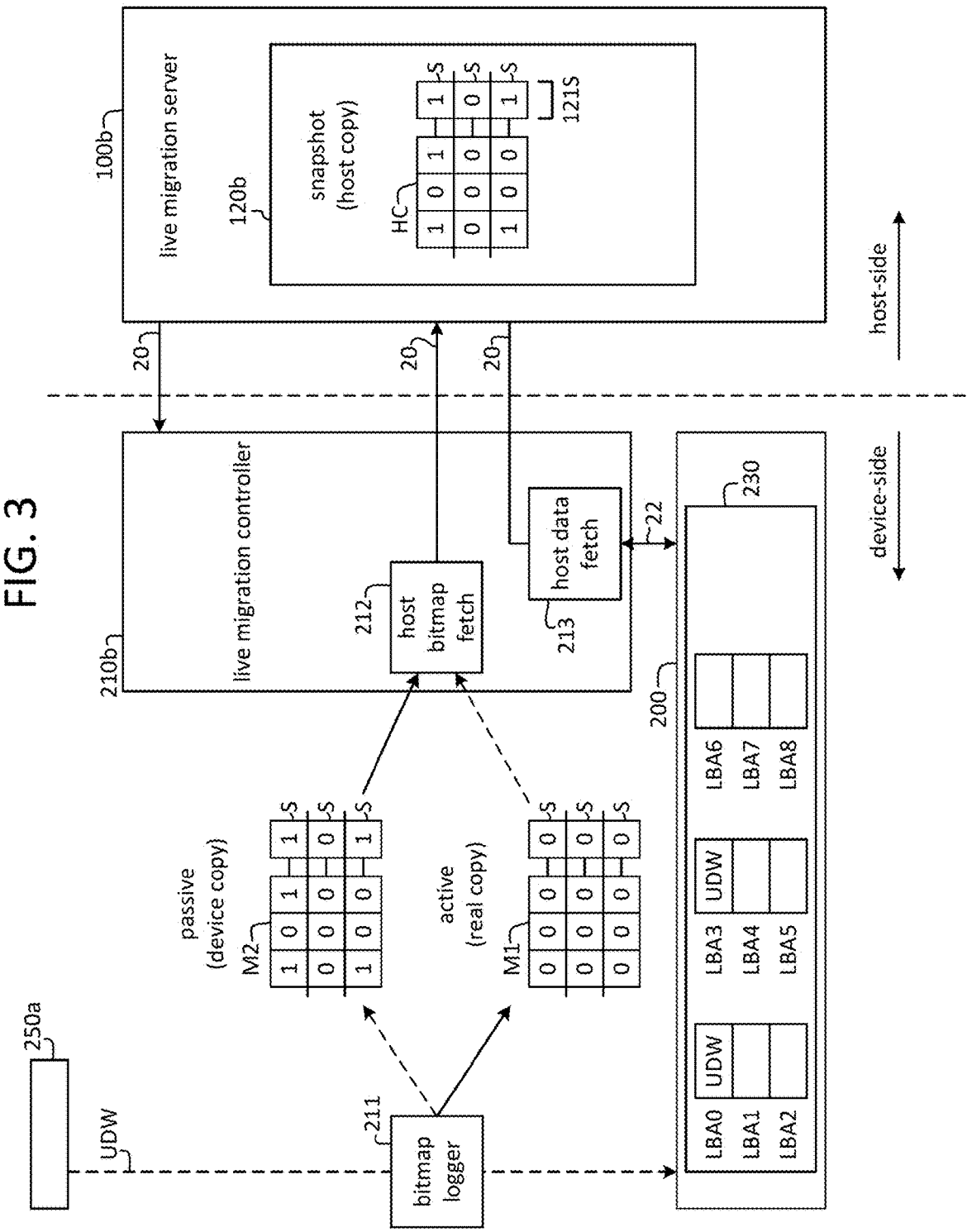
FIG. 3 is a simplified conceptual diagram depicting a switching of the roles of the first bitmap and the second bitmap depicted in FIG. 2, according to some embodiments of the present disclosure.

FIG. 3 is a simplified conceptual diagram depicting a switching of the roles of the first bitmap and the second bitmap depicted in FIG. 2, according to some embodiments of the present disclosure.

Referring to FIG. 2, as discussed above, the live migration controller 210b may create (e.g., provide) a BMP towards (e.g., at) the beginning of the live migration process. The live migration controller 210b may also create a BDP during the live migration process for incremental (e.g., iterative) updates to the data in the target storage 300. For example, a BDP may track (e.g., identify) locations of user data writes UDW from the source storage device 250a that may have occurred at the relevant data locations in the source storage 200 during or after a transferring of the BMP, and during a subsequent live migration copy operation LMCP (including a live migration copy read operation LMCPR and/or a live migration copy write operation LMCPW).

For example, at a mapping stage of the live migration process, the first data structure M1 may be the BMP. The live migration server 100b may request a copy of the BMP (e.g., the live migration server 100b may send a "query BMP" command to the live migration controller 210b (e.g., a host bitmap fetch 212). The live migration controller 210b may prepare a buffer (e.g., a location in the live migration controller memory 220b, shown in FIG. 1) for the BMP. The live migration controller 210b may set mapped bits (e.g., one or more 1's) into the BMP buffer if a current page (or LBA) of a mapping operation has valid data. When the mapping operation is complete, the BMP may become a passive bitmap (e.g., the BMP may no longer be available for updates to the bits of the bitmap) and the live migration controller 210b may transfer the BMP buffer (e.g., send a copy of the BMP) to the live migration server 100b. The live migration server 100b may parse the host copy HC of the BMP, read the mapped pages from the source storage 200 and copy over the relevant data (e.g., via a host data fetch 213) to the target storage 300 (see FIG. 1).

As discussed above, the live migration controller 210b may create a second data structure M2, which may be a first BDP, to track updates to the relevant locations of the source storage 200 that occur during or after the transferring of the BMP and the subsequent live migration copy operation LMCP. For example, the live migration controller 210b may prepare an active BDP buffer (e.g., an active bitmap buffer) having all bits set to "0" initially. A bitmap logger 211 may monitor (e.g., "snoop") user data writes UDW from the source storage device 250a, and may set bits (e.g., to "1") in the active BDP during the current live migration copy LMCP operation to identify the relevant locations of the user data writes UDW.

When the live migration server 100b has finished the live migration operation corresponding to the passive bitmap (e.g., a buffer for the passive BMP or a subsequent passive BDP), the live migration server 100b may send a command (e.g., a "swap BDP" command) to swap the active bitmap buffer and the passive bitmap buffer.

For example, and referring to FIG. 3, the buffer corresponding to the passive BMP may become an active BDP buffer (e.g., a second or subsequent BDP bitmap) and the first BDP buffer may become a passive BDP buffer. The live migration server 100*b* may send a command (e.g., a "query BDP" command) to the live migration controller 210*b* to transfer the passive buffer (e.g., copy a BDP corresponding to the passive buffer) to the live migration server 100*b*. When the passive bitmap has been transferred to the live migration server 100*b* (e.g., as a host copy HC), the live migration controller 210*b* may reset the passive bitmap buffer (e.g., set all of the bits to "0") and prepare it for tracking as an active bitmap buffer for the next BDP. The live migration server 100*b* may parse the host copy HC of the BDP, read the dirty pages from the source storage 200, and copy over the relevant data to the target storage 300.

Figure 4:
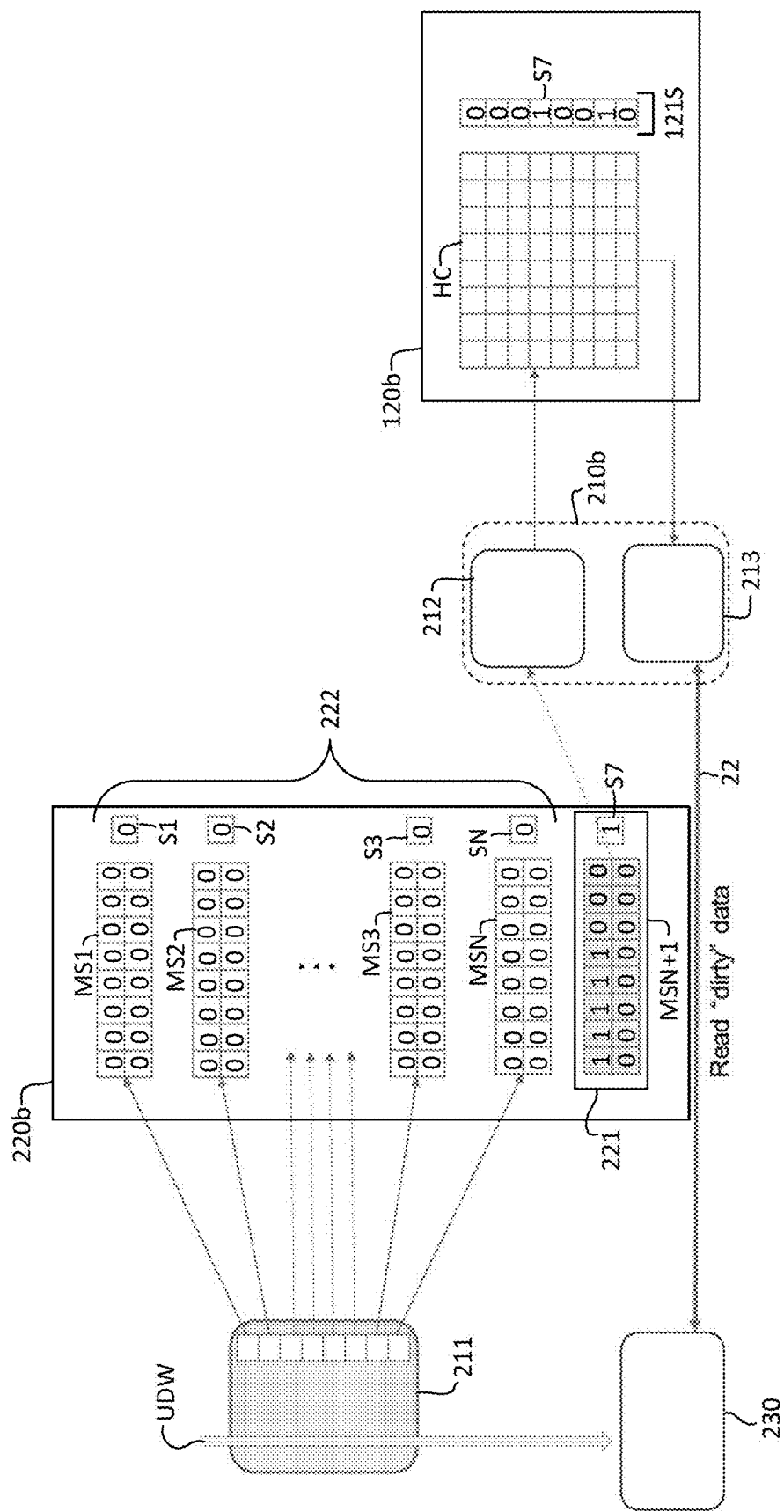
FIG. 4 is a simplified conceptual diagram depicting a partitioning of a dirty bitmap and a transferring of a passive section of the dirty bitmap, according to some embodiments of the present disclosure.

FIG. 4 is a simplified conceptual diagram depicting a partitioning of a dirty bitmap and a transferring of a passive section of the dirty bitmap, according to some embodiments of the present disclosure.

Referring to FIG. 4, as discussed above, the live migration controller 210*b* (see FIGS. 1-3) may partition (or divide) a BDP into N sections and work on less than an entire BDP snapshot.

In some embodiments, the live migration controller 210*b* may coordinate the management of the BDP sections (e.g., the tracking and copying of the metadata associated with each of the BDP sections) using only a single spare section (e.g., a single spare buffer) in the live migration controller memory 220*b*. For example, the single spare section may be sufficient to allow for BDP snapshot transferring and BDP section tracking to take place simultaneously. The live migration controller 210*b* may work on a given section, transfer the given section to the live migration server 100*b*, and continue working on tracking and identifying a next BDP section while the current BDP section is being transferred (e.g., transmitted) to the live migration server 100*b*.

For example, a first bitmap section MS1, a second bitmap section MS2, a third bitmap section MS3, and an Nth bitmap section MSN may correspond to N sections of a BDP bitmap. The live migration controller memory 220*b* may include active buffers 222 for each of the N sections, and may include one or more additional passive buffers 221 (e.g., MSN+1) for passive BDP sections to be transferred to the live migration server 120*b*.

In some embodiments, the live migration controller 210*b* may provide the live migration server 100*b* with intermediate updates, such that the live migration server 100*b* may start working on a transferred BDP section without having to wait for the whole BDP to be received in the live migration server memory 120*b*. Accordingly, a live migration server processing time may be improved (e.g., reduced).

In some embodiments, a per section status indicator bitmap 121S (e.g., a per BDP section "dirty section" bitmap) may be provided, which may include N bits only. The live migration controller 210*b* may transfer a given dirty BDP section only if the given dirty BDP section has a section status indicator S set to a "1" in the per section status indicator bitmap 121S. The live migration server 100*b* may process, a given dirty BDP section (e.g., parse the bitmap bits of the given dirty BDP section to determine whether an LBA corresponding to the given dirty BDP section includes data to be copied to the target storage 300) only if the given dirty BDP section has a section status indicator S set to a "1" in the per section status indicator bitmap 121S.

Figure 5A:
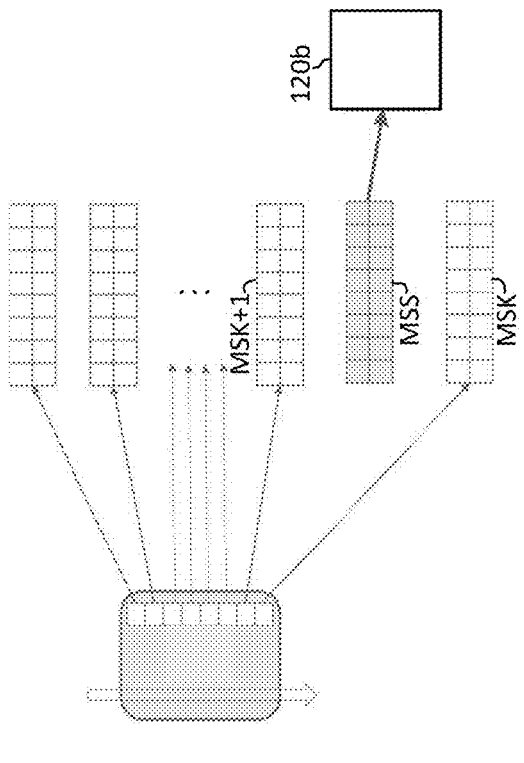
FIG. 5A, FIG. 5B, and FIG. 5C (collectively, FIG. 5) are simplified conceptual diagrams depicting a tracking and transferring of different sections of a dirty bitmap using an additional section, according to some embodiments of the present disclosure.
Figure 5B:
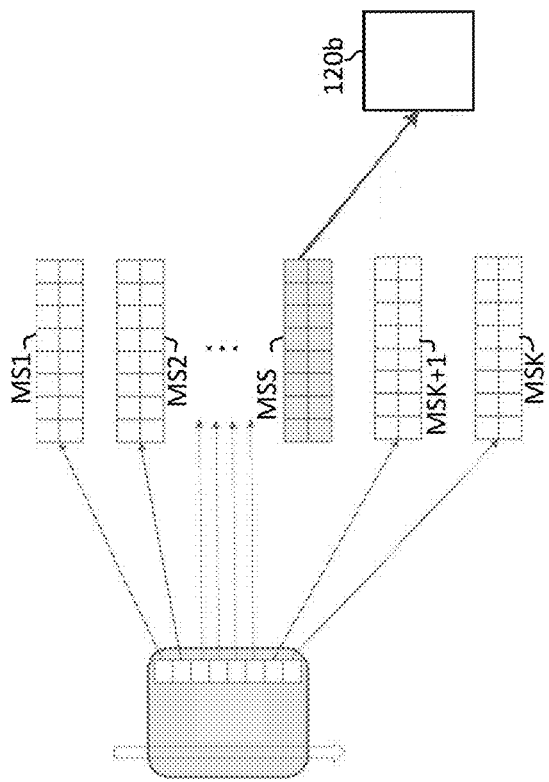
Figure 5C:
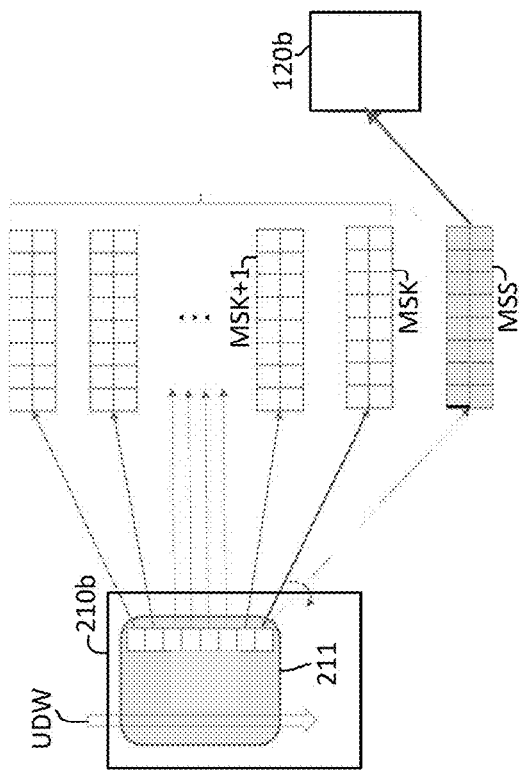

FIG. 5A, FIG. 5B, and FIG. 5C (collectively, FIG. 5) are simplified conceptual diagrams depicting a tracking and transferring of different sections of a dirty bitmap using an additional section, according to some embodiments of the present disclosure.

Referring to FIG. 5, a tracking and transferring (e.g., a simultaneous tracking and transferring) of bitmap sections using one additional buffer section will be described.

As discussed above, in some embodiments, the live migration controller 210*b* may maintain a BDP in N sections and an additional section as a spare section MSS (e.g., an N+1 section).

In some embodiments, the live migration controller 210*b* may track whether a section is dirty or not by managing (e.g., monitoring) the N sections of a dirty section bitmap BDP. For example, when the live migration server 100*b* issues a BDP fetch command, a given section (e.g., a Kth bitmap section MSK in FIG. 5A) may become a passive section (e.g., may become a spare section MSS) and may be transferred to the live migration server memory 120*b* while the live migration controller 210*b* actively tracks (e.g. performs active logging) in the remaining N sections.

For example, in some embodiments, the live migration controller 210*b* may transfer (e.g., may push) a given section to the live migration server memory 120*b*, and may reset and designate the given section, after it has been transferred, as a next reserved section (e.g., for tracking user data writes UDW). The live migration controller 210*b* may repeat these tracking, pushing, resetting, and designating operations for each of the dirty sections.

For example, FIG. 5A depicts a transferring of metadata from a passive spare section MSS to the live migration server memory 120*b* while the live migration controller 210*b* performs active logging in the remaining N sections. Referring to FIG. 5B, the Kth bitmap section MSK may become a passive section corresponding to the spare section MSS and may be transferred by the live migration controller 210*b* to the live migration server memory 120*b* while the spare section MSS (of FIG. 5A) has been reset and designated as a reserved active section for the live migration controller 210*b* to use in performing active logging for the Kth bitmap section MSK. Referring to FIG. 5C, the process may repeat for a K+1th bitmap section MSK+1.

In some embodiments, after all the dirty sections of the N dirty sections have been pushed to the live migration server memory 120*b*, the live migration controller may complete the command (e.g., the BDP fetch command). The live migration server 100*b* may process only the dirty sections (e.g., parse the bitmap bits of only dirty BDP sections to determine whether an LBA corresponding to a given dirty BDP section includes data to be copied to the target storage 300) in the live migration server memory 120*b*.

Figure 6:
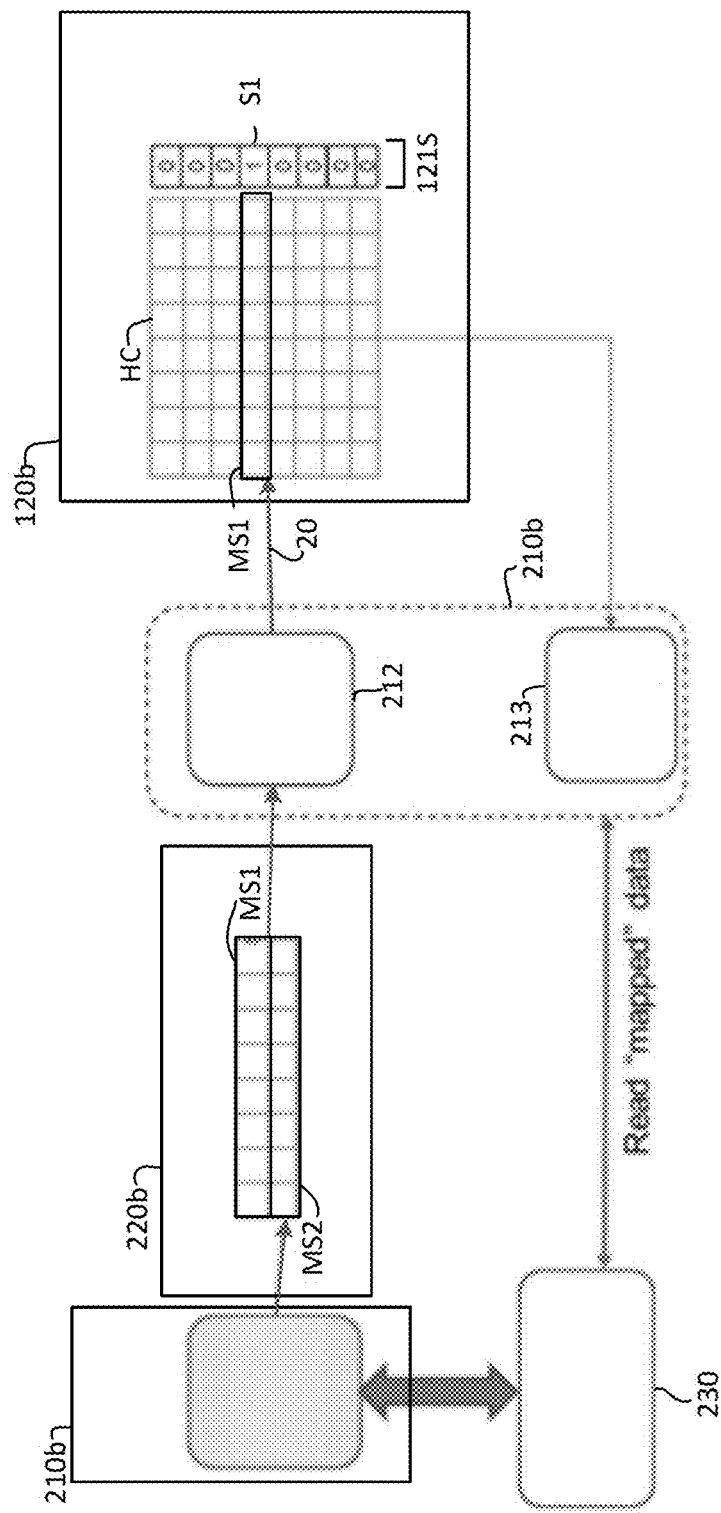
FIG. 6 is a simplified conceptual diagram depicting a partitioning of a bitmap of mapped pages and a transferring of a section of the bitmap of the mapped pages, according to some embodiments of the present disclosure.

FIG. 6 is a simplified conceptual diagram depicting a partitioning of a bitmap of mapped pages and a transferring of a section of the bitmap of the mapped pages, according to some embodiments of the present disclosure.

Referring to FIG. 6, in some embodiments, the live migration controller 210*b* may partition (e.g., divide) a BMP into N sections (e.g., a first bitmap section MS1 and a second bitmap section MS2). The live migration controller 210*b* may work on (e.g., work on mapping) one section of the BMP at a time. Accordingly, a live migration controller memory 220*b* usage may be improved by consuming less space with the BMP. For example, the live migration controller memory 220*b* may store as little as two BMP sections at a time, rather than two entire BMP bitmaps at a time.

For example, the live migration controller 210*b* may work on one given section of the BMP (e.g., MS1), may transfer the given section to the live migration server memory 120*b*, and may continue working on (e.g., building or preparing)

the next BMP section while the current BMP section is being transferred (or transmitted) to the live migration server memory 120b.

In some embodiments, the live migration server 100b may be provided with intermediate updates, from the live migration controller 210b, such that the live migration server 100b may start working on the one given section of the BMP (e.g., MS1) without waiting for the entire BMP to be received into the live migration server memory 120b. Accordingly, a live migration server 100b processing time may be improved (e.g., reduced).

In some embodiments, a per section status indicator bitmap 121S (e.g., a per BMP section "mapped section" bitmap) may be provided in the live migration server memory 120b, which may include only N bits. The live migration server 100b may process the mapped BMP sections (e.g., MS1 in FIG. 6) based on whether a respective section status indicator identifies the BMP section as corresponding to valid data in the source storage 200 to be copied to target storage 300 (see FIG. 1).

Typically, namespace (NS) utilization (e.g., storage utilization) may be less than 100% and, assuming a Gaussian distribution of LBA usage, less than all of the BMP sections may have mapped pages. Accordingly, a live migration server 100b parsing workload may be reduced. For example, rather than parsing through a BMP bit by bit, the live migration server 100b may identify specific sections of the BMP to work on for the live migration operation based on the respective section status indicators S (e.g., S1 in FIG. 6). Furthermore, the live migration controller 210b may refrain from transferring clean (e.g., empty) BMP sections (e.g., sections corresponding to LBAs that have no data) to the live migration server 100b. Accordingly, a bandwidth (e.g., a PCIe bandwidth) usage and a transfer time may be improved (e.g., reduced).

Figure 7:
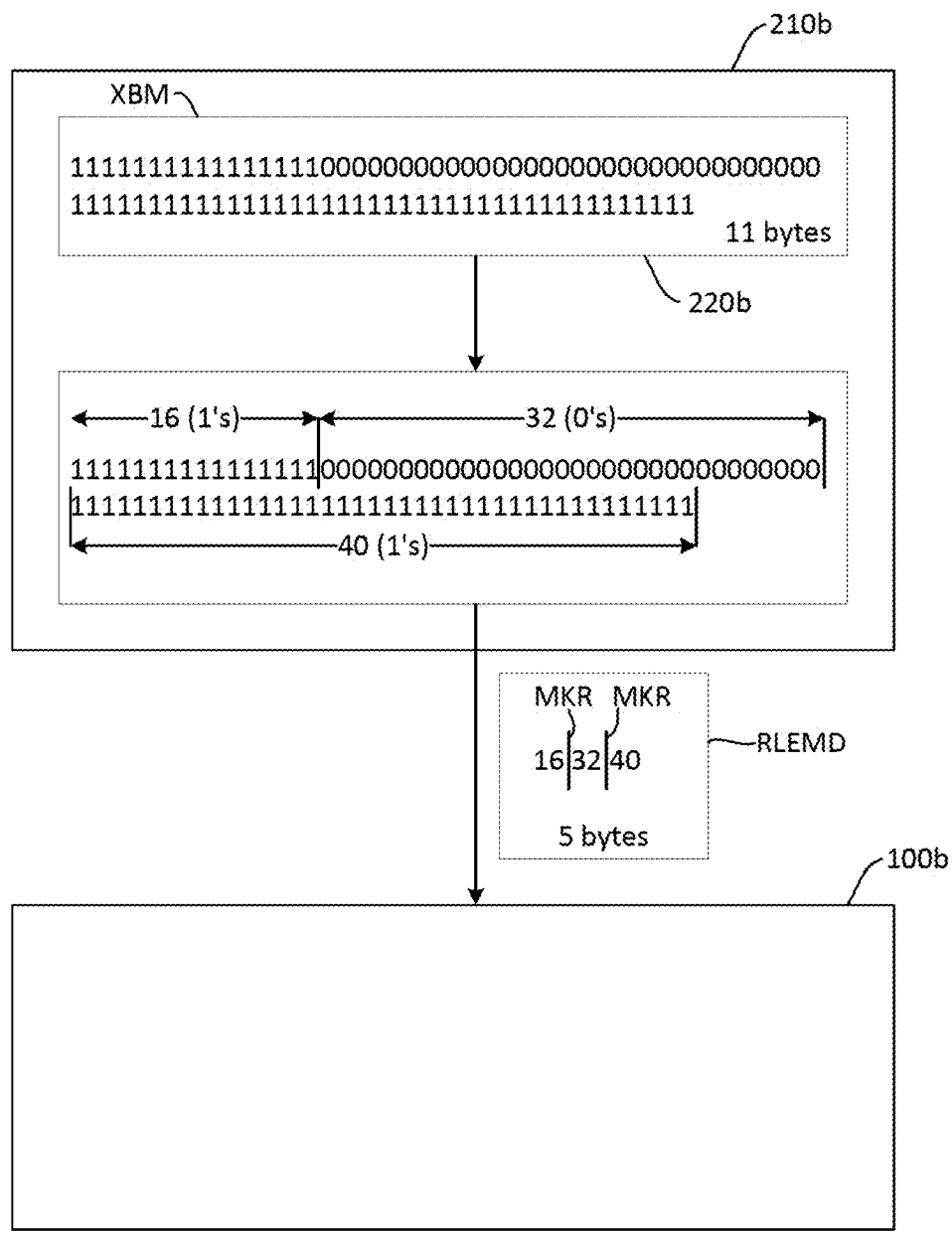
FIG. 7 is a simplified conceptual diagram depicting a run length encoding of a bitmap, according to some embodiments of the present disclosure.

FIG. 7 is a simplified conceptual diagram depicting a run length encoding of a bitmap, according to some embodiments of the present disclosure.

Referring to FIG. 7, in some embodiments, metadata associated with a BMP and/or a BDP section may be run-length encoded before (e.g., before or during) the transferring of the metadata to the live migration server 100b. Typically, as discussed above, NS utilization is not 100% and LBA access (e.g., user data writes UDW) are likely to have locality (e.g., be close in proximity to each other). Thus, run length encoding the metadata associated with a bitmap or bitmap section, may significantly improve (e.g., reduce) bandwidth usage (e.g., PCIe bandwidth usage) and live migration server memory 120b usage.

For example, an example bitmap XBM may include 88 bits of 1's and 0's (using a live migration controller memory 220b memory size of 11 bytes). The live migration controller 210b may run length encode the 88 bits by counting consecutive 1's and 0's. The example bitmap XBM may have 16 1's, followed by 32 0's, followed by 40 1's. Because only two values (1's and 0's) exist for the bitmap, a marker MKR may indicate a transition between values. Thus, the 11 bytes of metadata associated with the example bitmap XBM may be compressed to 5 bytes of run length encoded metadata RLEMD (e.g., two bytes per marker MKR and one byte per count of 16, 32, and 40). As used herein, a "marker" may be a special encoded value, which will not be used by a count. For example, 255 may be used as a marker, and only 0-254 may be used by a counter. So, the count may be encoded to <16><255><32><255><40>.

A live migration server 100b processing of the run length encoded metadata RLEMD may be improved compared to parsing raw bitmap data. For example, in the example bitmap XBM, 16 LBAs starting from an LBA0 may be mapped (e.g., if XBM is a BMP) or dirty (e.g., if XBM is a BDP). The live migration server 100b may perform a live migration of data from the source storage 200 corresponding to the LBAs from LBA0 to an LBA15. 32 LBAs starting from an LBA16 to an LBA47 may not be mapped (or may not be dirty). Accordingly, the live migration server 100b may perform no action for the LBAs from LBA16 to LBA47. 40 LBAs starting from an LBA48 to an LBA87 may be mapped (or dirty). Accordingly, the live migration server 100b may perform a live migration of data from the source storage 200 corresponding to the LBAs from LBA48 to LBA87.

Thus, a computing workload may be effectively shifted from the live migration server 100b to the live migration controller 210b (e.g., a CPU processing overhead may be transferred from a host side to a device side).

Although the present disclosure refers to a live migration process, it should be understood that many of the techniques and operations may be beneficial to a static migration process (e.g., a migration of data from the source storage 200 to the target storage 300 when the source storage 200 may not receive a user data write UDW).

According to some aspects of embodiments of the present disclosure, an example operation will be described. For example, based on receiving a namespace provided by a live migration server 100b, the live migration controller 210b may: (1) create a first bitmap (e.g., a bitmap of "mapped" pages or BMP), for mapping the namespace to the locations of the relevant data within the source storage 200, and (2) divide the first bitmap into N sections. When the live migration controller 210b has mapped a first section of the N sections, the live migration controller 210b may transfer only the first section of the first bitmap to the live migration server 100b and continue mapping the remaining sections while the live migration server 100b performs a migration of data based on the first section of the first bitmap.

The live migration controller 210b may: (1) create a second bitmap (e.g., a bitmap of "dirty" pages or BDP), for tracking locations of user data writes UDW to the source storage 200 (e.g., from a source server) that occur while, or after, the first section of the first bitmap is transferred to the migration server (e.g., during the migration server's copying of metadata associated with the first bitmap and/or during the migration server's copying of data from the source storage 200), and (2) partition the second bitmap into N sections (e.g., respectively corresponding to the N sections of the first bitmap).

After the live migration server 100b has completed migrating the source storage data associated with, at least, the first section of the first bitmap, the live migration controller 210b may transfer, to the live migration server 100b, only a first section of the second bitmap, corresponding to a location of a user data write UDW to the source storage 200. The live migration controller 210b may track user data writes UDW to the source storage 200, that occur while or after the first section of the first bitmap is transferred to the migration server, in one spare section of the live migration controller memory 220b having the same size as one of the N sections of the second bitmap.

The live migration controller 210b may run length encode metadata associated with the first bitmap, the second bitmap, and/or section status indicator bits before transferring the metadata to the live migration server 100b (to further save memory space, data bus bandwidth, and host processing time).

Figure 8:
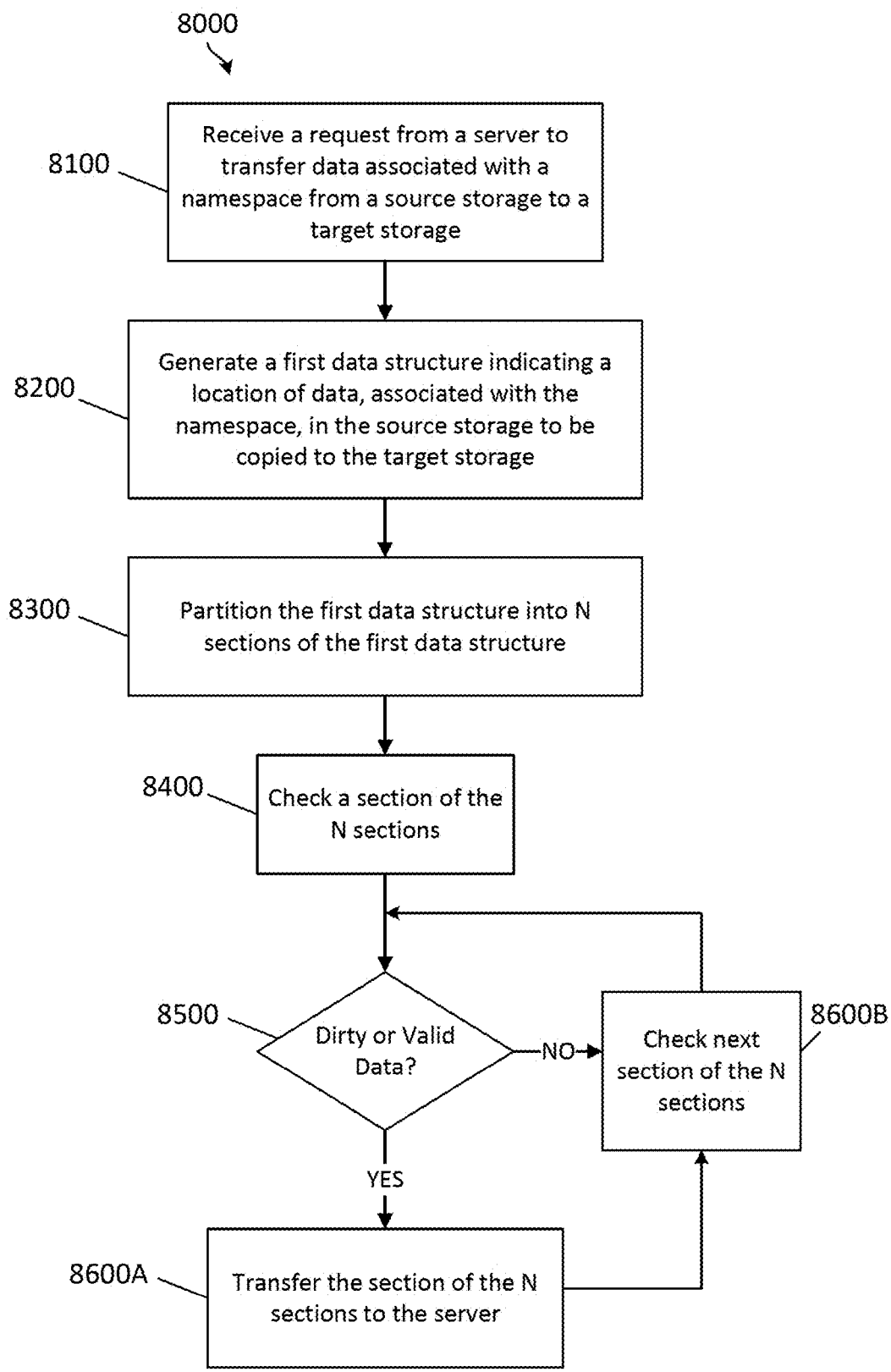
FIG. 8 is a flowchart depicting example operations of methods for managing a migration of data, according to some embodiments of the present disclosure.

FIG. 8 is a flowchart depicting example operations of methods for managing a migration of data, according to some embodiments of the present disclosure.

Referring to FIG. 8, a method 8000 for managing a migration of data may include: receiving, at a storage controller, a request from a server to transfer data associated with a namespace from a source storage to a target storage (operation 8100); generating, by the storage controller, a first data structure indicating a location of data, associated with the namespace, in the source storage to be copied to the target storage (operation 8200); partitioning, by the storage controller, the first data structure into N sections of the first data structure (operation 8300); checking, by the storage controller, a first section of the N sections (operation 8400); determining whether the first section of the N sections corresponds to an LBA of the source storage including data (e.g., valid or dirty data) to be copied to the target storage (operation 8500); transferring the first section of the N sections (e.g., less than all of the N sections of the first data structure) to the server based on determining that the first section of the N sections corresponds to an LBA of the source storage including data (e.g., valid or dirty data) to be copied to the target storage (operation 8600A); and checking a second section (e.g., a next section) of the N sections based on determining that the first section of the N sections corresponds to an LBA of the source storage that does not include data (e.g., valid or dirty data) to be copied to the target storage (operation 8600B).

As used herein, when a "data structure" is described as "indicating" a location of data, it may mean that an element of the data structure (e.g., a bit of a bitmap, if the data structure is or includes a bitmap) points to, or indicates, the location of the data.

Accordingly, embodiments of the present disclosure provide improvements and advantages for a copying of data from a source storage to a target storage (e.g., during a live migration process or a static migration process). By partitioning bitmaps into sections, providing section status indicator bits, and run length encoding the metadata associated with the bitmap or bitmap sections, computing resources (e.g., memory, bandwidth, and host or storage device processing) may be used more efficiently.

While embodiments of the present disclosure have been particularly shown and described with reference to the embodiments described herein, it will be understood by those of ordinary skill in the art that various changes in form and details may be made therein without departing from the spirit and scope of the present invention as set forth in the following claims and their equivalents.

What is claimed is:

1. A method for managing a migration of data, the method comprising:
partitioning a first data structure into N sections of the first data structure, N being an integer greater than one, the first data structure indicating a location, associated with a source storage, having data to be copied to a target storage;
storing a copy of a first subset of the N sections of the first data structure in a first buffer having a capacity that is smaller than a size of the N sections, the copy of the first subset of the N sections representing a first state of the first subset, the first subset indicating a location of a first data write to the source storage, the N sections corresponding to N second buffers that are available for logging data writes, and the first buffer being an additional buffer to the N second buffers that is set aside from logging data writes; and
transferring the copy of the first subset of the N sections of the first data structure from the first buffer.

2. The method of claim 1, further comprising:
partitioning a second data structure into N sections of the second data structure;
tracking, by using the second data structure, a location of a third data write to the source storage; and
initiating a transfer of a subset of the N sections of the second data structure to a migration server, one section of the subset of the N sections of the second data structure indicating the location of the third data write.

3. The method of claim 2, further comprising:
storing a passive copy of one active section of the N sections of the second data structure in an N+1th section of a memory of a storage controller;
transferring the passive copy to the migration server; and
tracking a fourth data write to the source storage associated with the one active section of the N sections during or after the transferring of the passive copy to the migration server.

4. The method of claim 2, further comprising run length encoding a metadata associated with the second data structure.

5. The method of claim 2, wherein:
a first section of the subset of the N sections of the second data structure is selected for the transfer based on a section status indicator corresponding to the first section, the section status indicator indicating that a source data corresponding to the first section is to be copied to the target storage; and
the method further comprises:
transferring the section status indicator to the migration server; and
selecting, by the migration server, the first section for a source data copying operation based on the section status indicator.

6. The method of claim 5, wherein:
the section status indicator comprises a first state indicating that a section of the N sections of the second data structure corresponds to a source data to be copied to the target storage, and a second state indicating that a section of the N sections of the second data structure is to be omitted from selection for the transfer;
the first data write occurred during or after a transferring of a previous data structure to the migration server; and
the second data write occurred during or after the transferring of the copy of the first subset of the N sections of the first data structure to the migration server.

7. The method of claim 1, wherein:
the copy of the first subset of the N sections of the first data structure is selected for the transfer based on a section status indicator corresponding to the first subset, the section status indicator indicating that a source data corresponding to the first subset is to be copied to the target storage; and
the method further comprises transferring the section status indicator to a migration server.

8. The method of claim 7, wherein:
the section status indicator comprises a first state indicating that a section of the N sections of the first data structure corresponds to a source data to be copied to the target storage, and a second state indicating that a section of the N sections of the first data structure is to be omitted from selection for the transfer; and
the first data write occurred during or after a transferring of a previous data structure to the migration server.

9. The method of claim 1, further comprising run length encoding a metadata associated with the first data structure.

10. A storage device for managing a migration of data, the storage device being configured to:
   partition a first data structure into N sections of the first data structure, N being an integer greater than one, the first data structure indicating a location, associated with a source storage, having data to be copied to a target storage;
   perform a first iteration of transferring based on the first data structure, the first iteration comprising:
      storing a copy of a first subset of the N sections of the first data structure in a first buffer having a capacity that is smaller than a size of the N sections, the copy of the first subset of the N sections representing a first state of the first subset, the first subset indicating a location of a first data write to the source storage, the N sections corresponding to N second buffers that are available for logging data writes, and the first buffer being an additional buffer to the N second buffers that is set aside from logging data writes; and
      transferring the copy of the first subset of the N sections of the first data structure from the first buffer; and
   perform a second iteration of transferring based on the first data structure, the second iteration comprising:
      storing a copy of a second subset of the N sections of the first data structure in the first buffer, the second subset indicating a location of a second data write to the source storage; and
      transferring the copy of the second subset of the N sections of the first data structure from the first buffer,
   wherein an amount of data transferred from the first buffer based on the first iteration and the second iteration is greater than the capacity of the buffer.

11. The storage device of claim 10, wherein the storage device is configured to:
   partition a second data structure into N sections of the second data structure;
   track, by using the second data structure, a location of a third data write to the source storage; and
   initiate a transfer of a subset of the N sections of the second data structure to a migration server, one section of the subset of the N sections of the second data structure indicating the location of the third data write.

12. The storage device of claim 11, wherein the storage device is configured to:
   store a passive copy of one active section of the N sections of the second data structure in an N+1th section of a storage controller memory;
   transfer the passive copy to the migration server; and
   track a fourth data write to the source storage associated with the one active section of the N sections during or after the transfer of the passive copy to the migration server.

13. The storage device of claim 11, wherein the storage device is configured to run length encode a metadata associated with the second data structure.

14. The storage device of claim 11, wherein the storage device is configured to:
   select a first section of the subset of the N sections of the second data structure for the transfer based on a section status indicator corresponding to the first section, the section status indicator indicating that a source data corresponding to the first section is to be copied to the target storage; and
   transfer the section status indicator to the migration server.

15. The storage device of claim 14, wherein:
   the section status indicator comprises a first state indicating that a section of the N sections of the second data structure corresponds to a source data to be copied to the target storage, and a second state indicating that a section of the N sections of the second data structure is to be omitted from selection for the transfer;
   the first data write occurred during or after a transferring of a previous data structure to the migration server; and
   the second data write occurred during or after the transferring of the copy of the first subset of the N sections of the first data structure to the migration server.

16. The storage device of claim 11, wherein the storage device is configured to:
   select the copy of the first subset of the N sections of the first data structure for the transfer based on a section status indicator corresponding to the first subset, the section status indicator indicating that a source data corresponding to the first subset is to be copied to the target storage; and
   transfer the section status indicator to a migration server.

17. The storage device of claim 16, wherein the section status indicator comprises a first state indicating that a section of the N sections of the first data structure corresponds to a source data to be copied to the target storage, and a second state indicating that a section of the N sections of the first data structure is to be omitted from selection for the transfer; and
   the first data write occurred during or after a transferring of a previous data structure to the migration server.

18. The storage device of claim 10, wherein the storage device is configured to run length encode a metadata associated with the first data structure.

19. A system for managing a migration of data, the system comprising:
   a migration server; and
   a storage device, wherein the storage device is configured to:
      partition a first data structure into N sections of the first data structure, N being an integer greater than one, the first data structure indicating a location, associated with a source storage, having data to be copied to a target storage;
      store a copy of a first subset of the N sections of the first data structure in a first buffer having a capacity that is smaller than a size of the N sections, the copy of the first subset of the N sections representing a first state of the first subset, the first subset indicating a location of a first data write to the source storage, the N sections corresponding to N second buffers that are available for logging data writes, and the first buffer being an additional buffer to the N second buffers that is set aside from logging data writes; and
      transfer the copy of the first subset of the N sections of the first data structure from the buffer.

20. The system of claim 19, wherein the storage device is configured to:
   partition a second data structure into N sections of the second data structure;
   track, by using the second data structure, a location of a third data write to the source storage; and
   initiate a transfer of a subset of the N sections of the second data structure to a migration server, one section of the subset of the N sections of the second data structure indicating the location of the third data write.

* * * * *